(12) United States Patent
Kim

(10) Patent No.: US 7,274,414 B2
(45) Date of Patent: Sep. 25, 2007

(54) LIQUID CRYSTAL DISPLAY MODULE AND ASSEMBLING METHOD THEREOF

(75) Inventor: Kyoung Sub Kim, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 244 days.

(21) Appl. No.: 10/734,196

(22) Filed: Dec. 15, 2003

(65) Prior Publication Data

US 2004/0125270 A1    Jul. 1, 2004

(30) Foreign Application Priority Data

Dec. 27, 2002    (KR) .................... 10-2002-0084895

(51) Int. Cl.
*G02F 1/1333*    (2006.01)

(52) U.S. Cl. .......................... 349/58; 349/61

(58) Field of Classification Search ................. 349/58, 349/65, 113, 61
See application file for complete search history.

(56) References Cited

U.S. PATENT DOCUMENTS

| | | | | |
|---|---|---|---|---|
| 4,934,793 | A * | 6/1990 | Klein | 349/67 |
| 6,407,781 | B2 * | 6/2002 | Kitada | 349/58 |
| 6,639,636 | B2 * | 10/2003 | Yoo et al. | 349/61 |
| 2002/0057405 | A1 * | 5/2002 | Morishita et al. | 349/113 |
| 2003/0156234 | A1 * | 8/2003 | Chiou | 349/65 |
| 2006/0256255 | A1 * | 11/2006 | Minami | 349/65 |

* cited by examiner

*Primary Examiner*—Toan Ton
(74) *Attorney, Agent, or Firm*—Morgan, Lewis & Bockius LLP

(57) ABSTRACT

A liquid crystal display module includes a liquid crystal panel, a bottom cover having a plurality of lamps installed thereabove, a reflection sheet for reflecting the light generated from the lamps and a main support having openings in which the lamps are inserted, an extension part extending from the openings, and a supporting member for supporting the liquid crystal panel.

19 Claims, 16 Drawing Sheets

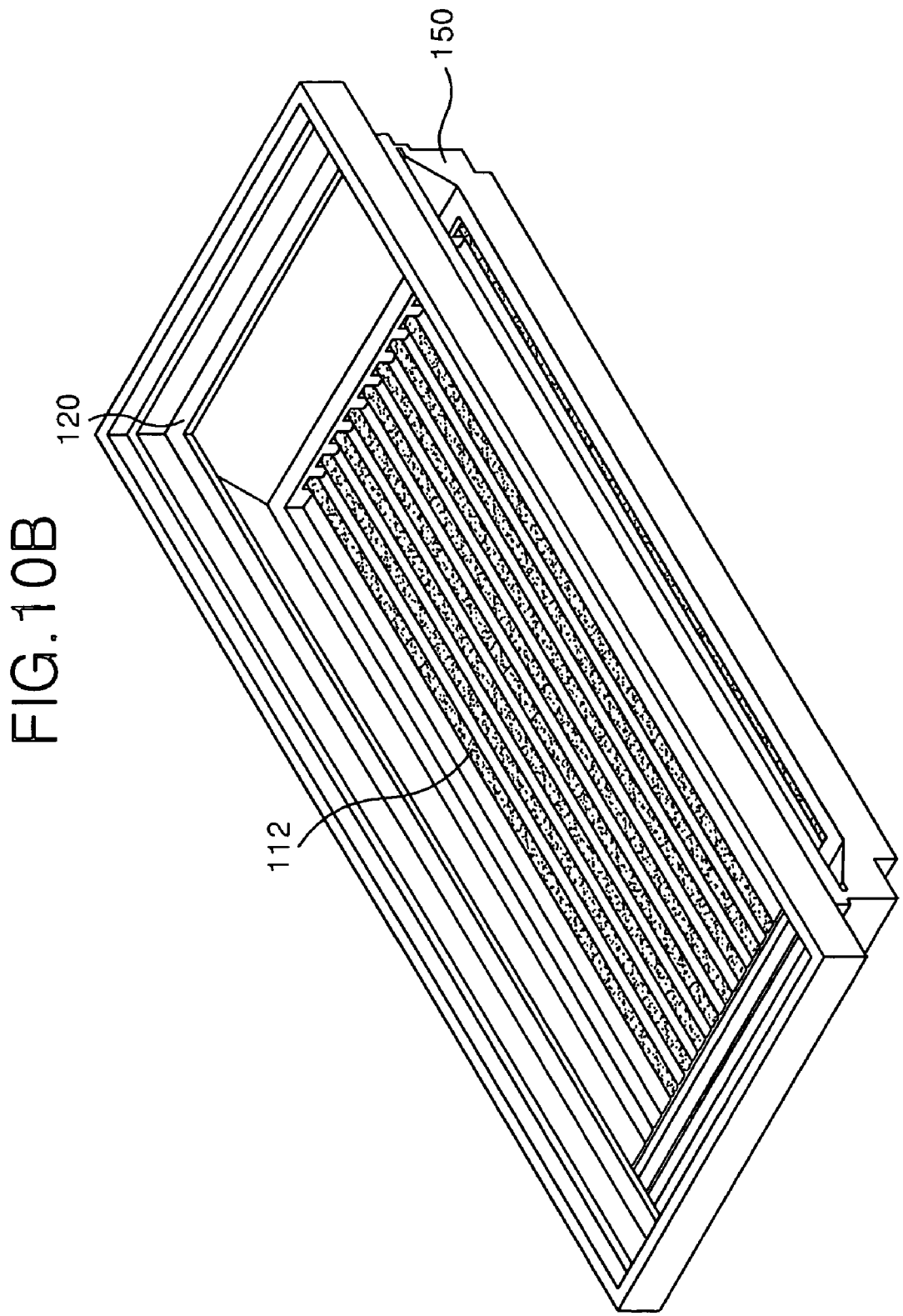

LIQUID CRYSTAL DISPLAY MODULE AND ASSEMBLING METHOD THEREOF

BACKGROUND OF THE INVENTION

The present invention claims the benefit of Korean Patent Application No. 2002-84895 filed in Korea on Dec. 27, 2003, which is hereby incorporated by reference

1. Field of the Invention

The present invention relates to a liquid crystal display module, more particularly to a liquid crystal display module having a direct-below-type back light and assembling method thereof.

2. Description of the Related Art

In general, the trend in liquid crystal display (hereinafter, LCD) has been a gradually widening application scope due to the lightness, thin profile and low power consumption of a liquid crystal panel. In accordance with this trend, the LCD is now used in office automation devices, audio/video device, etc. The LCD transmits a quantity of light through a matrix of pixels in accordance with an image signal applied to control switches within the pixels to display desired pictures in a screen.

The LCD is not a spontaneous light-emitting display and needs a back light as a light source. The two types of back light for LCD are direct-below-type and an edge-type. The edge-type LCD has a fluorescent lamp installed on the outside of a transparent optical guide plate. Thus, light is made incident upon the entire surface of a liquid crystal panel by using the transparent optical guide plate from the fluorescent lamp. The direct-below-type LCD has the light source arranged directly below a rear surface of the liquid crystal panel and directly radiates light onto the entire rear surface of the liquid crystal panel. As compared with the edge-type LCD, the direct-below-type LCD has the advantage of using a plurality of light sources, which can improve brightness and provide light for larger liquid crystal panels.

FIG. 1 is a cross-sectional view illustrating a liquid crystal display module adopting a related art direct-below-type back light unit. As shown in FIG. 1, the liquid crystal panel module 1 includes a direct-below-type back light unit 30, a liquid crystal panel 4 stacked on the direct-below-type back light unit 30. A guide panel 6 for supporting the liquid crystal panel 4 is placed between the direct-below-type back light unit 30 and the liquid crystal panel 4. A top case 8 encloses the border of the liquid crystal panel 4 and the side surface of the guide panel 6.

The liquid crystal panel 4 includes a thin film transistor array substrate 4a, a color filter array substrate 4b, and liquid crystal materials (not shown) injected between the thin film transistor array substrate 4a and the color filter array substrate 4b. Red (R), green (G), and blue (B) colored filters and a black matrix are located on the color filter array substrate 4b. Liquid crystal cells are arranged in an active matrix on the thin film transistor array substrate 4a. Each of cells respectively has a thin film transistor for switching a video signal to the cell. Video signals applied to the cells change the index of refraction in the liquid crystal cells to thereby display pictures corresponding to the video signals.

A tape carrier package (not shown) having a driver integrated circuit mounted thereon is installed on the thin film transistor array substrate 4a of the liquid crystal panel 4, wherein the driver integrated circuit is used to supply driving signals to the thin film transistors. The guide panel 6 is a mold, and has a supporting member in which the liquid crystal panel 4 is installed and supported. The top case 8 has a plane face and a side face bent vertically which are fabricated in a square band shape. The top case 8 is formed to enclose the edge of the liquid crystal panel 4 and the guide panel 6.

FIG. 2 is a perspective view of a portion of the direct-below-type back light unit shown in FIG. 1. A cross-sectional view illustrating the direct-below-type back light unit shown in FIG. 1 along the line I-I' is shown in FIG. 3. Referring to FIG. 2 and FIG. 3, the direct-below-type back light unit 30 includes a bottom cover 2 and a reflection plate 14 attached to the front of the bottom cover 2. A plurality of lamps 12 are located above the bottom cover 2. A diffusion plate 16 covers the entire front surface of the bottom cover 2. Optical sheets (not shown) are located on the diffusion plate 16. Support sides 18 cover the ends of lamps 12 and are installed on both sides of the bottom cover 2. The support sides 18 have openings 19 that receive the lamps 12.

The bottom cover 2 has a bottom surface 2b and an inclined surface 2a extended from the bottom surface 2b. The bottom surface 2b together with the inclined surface 2a form a step. Projections 22 are formed in a designated interval along both sides of the bottom surface 2b of the bottom cover 2.

The support side 18 has an inclined surface with a specified slope and openings 19 in which lamps 12 are inserted. The support sides 18 are used to support the lamps 12 inserted in the openings 19. These support sides 18 are attached to the bottom cover 2 using screws (not shown). The rear surfaces of the support sides 18, shown in FIG. 1, have many holes into which the projections 22 on the bottom cover 2 are inserted.

FIG. 4 is a perspective view illustrating a jig. As illustrated in FIG. 4, to insert each of the lamps 12 into the openings 19 of the support sides 18, a jig 28 corresponding to the length of the lamps 12 is used. The support sides 18 serve as a lamp holder supporting many lamps 12. The surface of the support sides 18 are coated with reflective materials, such as aluminim (Al). The support sides 18 reflect light to the liquid crystal panel 4 so as to improve the efficiency of light incidence upon the liquid crystal panel 4.

The reflection plate 14 is made of aluminum (Al) material and is the same shape as the bottom cover 2. Further, the reflection plate 14 has a bottom surface overlapping the bottom surface 2a of the bottom cover 2 and an inclined surface correspondingly bent to the inclined surface 2b of the bottom cover 2. The reflection plate 14 is attached to the bottom surface 2b and the inclination surface 2a of the bottom cover 2 using double-sided adhesive tapes 24. That is, the bottom surface 2b of the bottom cover 2 is adhered to one side of the double-sided adhesive tape 24, and the rear surface of the reflection plate 14 is adhered to the other side of the double-sided adhesive tape 24. Hence, the reflection plate 14 is attached to the front surface of the bottom cover 2 by using the double-sided adhesive tape 24. This reflection plate 14 reflects lights from lamps 12 to the liquid crystal panel 4 to thereby improve the efficiency of light incidence upon the liquid crystal panel 4.

Each of the lamps 12 comprises a glass tube filled with inert gases that has a cathode and an anode respectively installed at the opposite ends of the glass tube. Phosphorus is on the inside wall of the glass tube. The plurality of the lamps 12 are grouped into collections with size n (where n is a positive integer) and a collection of lamps are inserted into a lamp holder 10.

The diffusion plate 16 enables the light radiated from the lamps 12 to go toward the liquid crystal panel 4 with wide range of incident angles and spreads the light out. The diffusion plate 16 includes a transparent resin film. Both surfaces of the resin film are coated with light-diffusion materials.

The light radiated from the diffusion plate 16 is diffused light. The efficiency of light through the liquid crystal display is higher when the incident light is perpendicular to the liquid crystal panel 4. For this reason, many optical sheets (not shown) are placed on the diffusion plate 16. The optical sheets (not shown) make the light from the diffusion plate 16 become perpendicular the liquid crystal panel 4, and hence improve the brightness of the liquid crystal display module 1 and hence reduce power consumption. Thus, the light from the diffusion plate 16 reaches the liquid crystal panel 4 via a plurality of optical sheets.

In order to insert the lamps 12 into the support sides 18, the support sides 18 are fixed using a jig 28 corresponding to the length of each of the lamps 12, and then the lamps 12 are inserted into the openings 19 in the support sides 18. After inserting the lamps 12 with the support sides 18, the support sides 18 and the bottom cover 2 are coupled using screws (not shown).

FIGS. 5a to 5e illustrate the successive steps of a method to assemble a related art direct-below-type back light unit of a liquid crystal display module. An assembling method for the liquid crystal display module adopting the related art direct-below-type back light unit is fully explained with reference to FIGS. 5a to 5e. The bottom cover 2, shown in FIG. 5a, is open except for the inclined surface 2a and the bottom surface 2b. The refection plate 14 made of aluminum (Al) is stacked on the bottom cover 2, and then the bottom cover 2 and the reflection plate 14 are glued together using the double-sided tape 24.

As shown in FIG. 5b, a jig 28 is used to fix the support sides 18 so that the lamps 12 can be inserted into the fixed support sides 18. Then, the jig 28 is removed from the support sides 18, and as shown in FIG. 5c, the support sides 18 with the lamps 12 inserted are combined with the bottom cover 2. The bottom cover 2 and the support sides 18 combined with the lamps 12 are coupled using screws (not shown). Thereafter, the guide panel 6 shown in FIG. 5d is coupled to the bottom cover 2, which has the support sides 18 and lamps 12. Thus, the direct-below-type back light unit 30, as shown in FIG. 5e, is assembled.

As mentioned above, the direct-below-type back light unit 30 of the liquid crystal display module 1 uses a reflective coating on the support sides 18 for reflecting light to the liquid crystal panel 4. This reflective coating is typically made of aluminum (Al), which is expensive. Also, since a jig 28 has to be used to fix the support sides 18 during step of inserting the lamps 12 into the support sides 18, assembly time is increased.

SUMMARY OF THE INVENTION

Accordingly, the present invention is directed to a liquid crystal display module and assembling method thereof that substantially obviates one or more of the problems due to limitations and disadvantages of the related art.

An object of the present invention is to provide a liquid crystal display module and an assembling method thereof that can enhance the assembling method of a direct-below-type back light unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a liquid crystal display module including a liquid crystal panel, a bottom cover having a plurality of lamps installed thereabove, a reflection sheet for reflecting the light generated from the lamps and a main support having openings in which the lamps are inserted, an extension part extending from the openings, and a supporting member for supporting the liquid crystal panel.

In another aspect, a method for assembling a liquid crystal display module includes the steps of stacking a reflection sheet on a bottom surface of a bottom cover, inserting a lamp into openings of a main support, coupling the main support having the lamp installed therein with the bottom cover having the reflection sheet stacked thereon.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 10a to 10c illustrate successive steps of an assembling method for a direct-below-type back light unit of a liquid crystal display module according to an embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
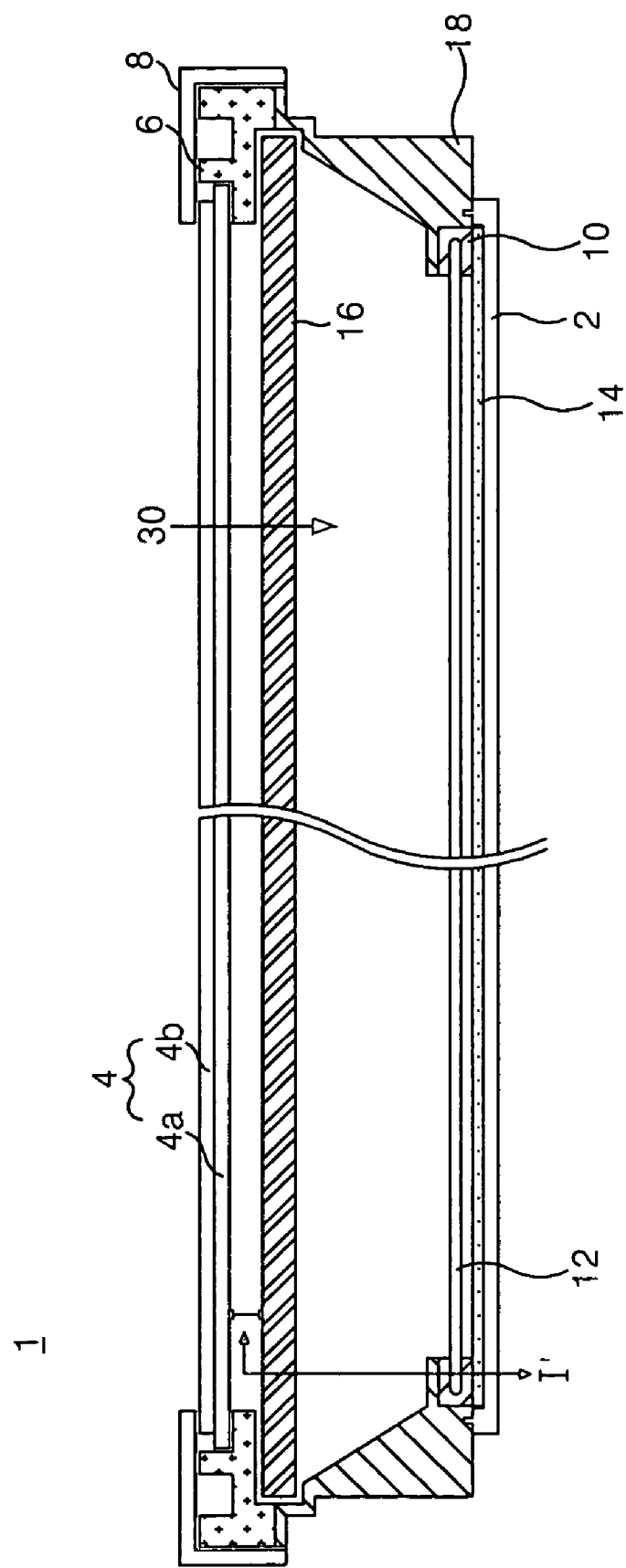
FIG. 1 is a cross-sectional view illustrating a liquid crystal display module adopting a related art direct-below-type back light unit.
Figure 2:
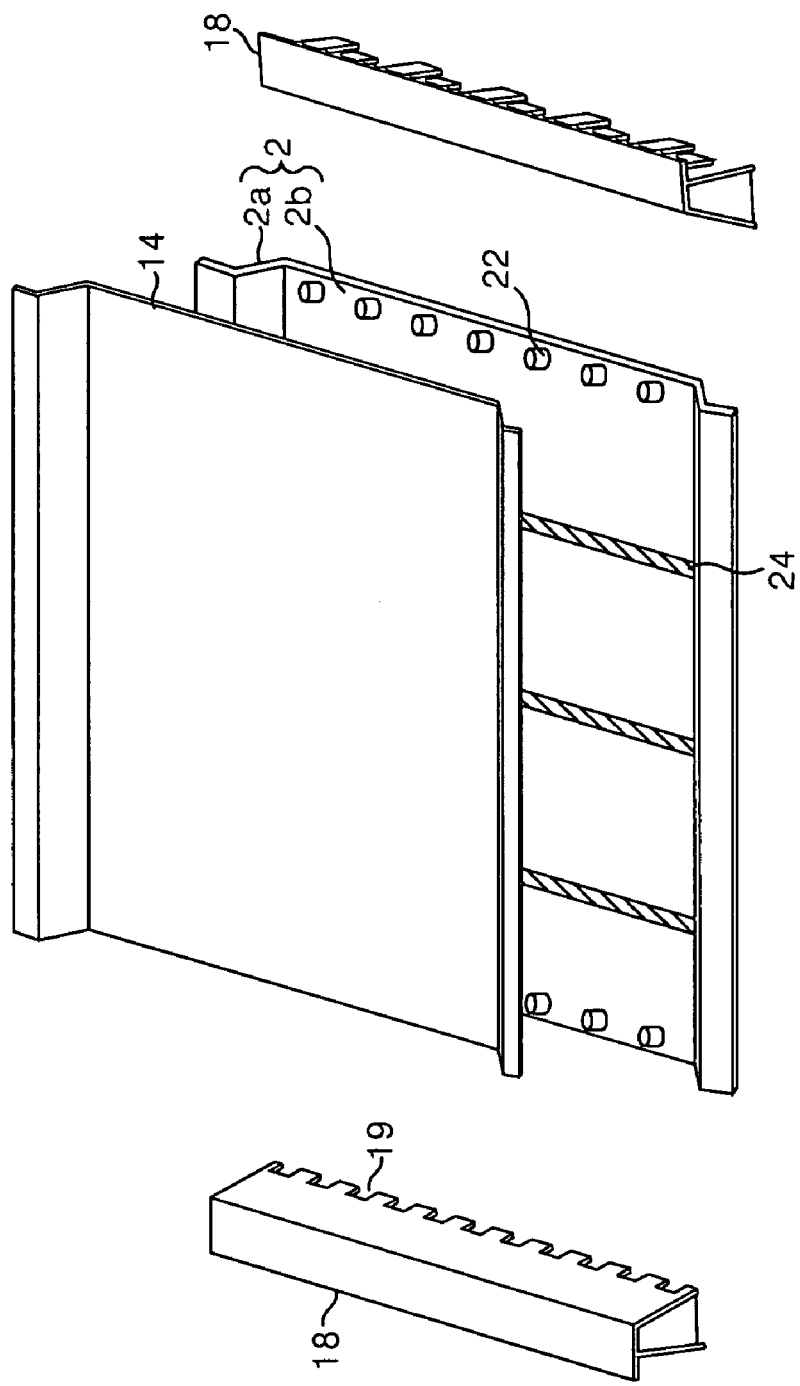
FIG. 2 is a perspective view of a portion of the direct-below-type back light unit shown in FIG. 1.
Figure 3:
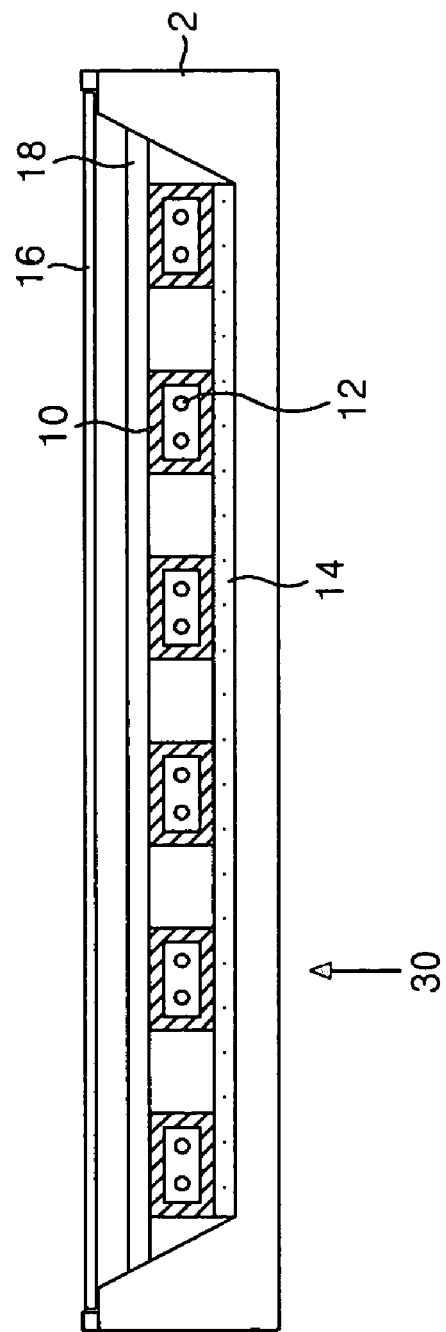
FIG. 3 is a cross-sectional view illustrating the direct-below-type back light unit shown in FIG. 1 along the line I-I'.
Figure 4:
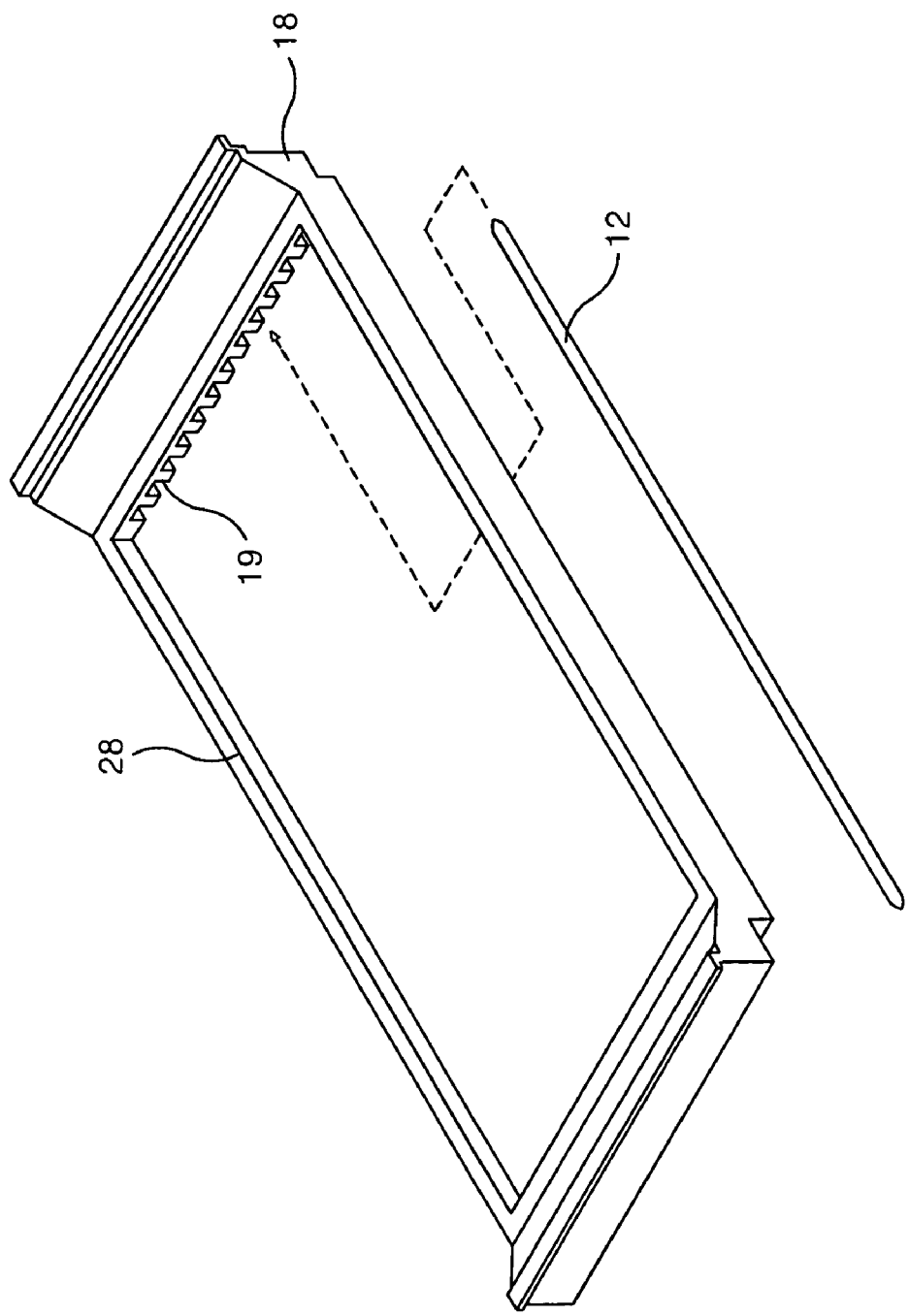
FIG. 4 is a perspective view illustrating a jig.
Figure 5A:
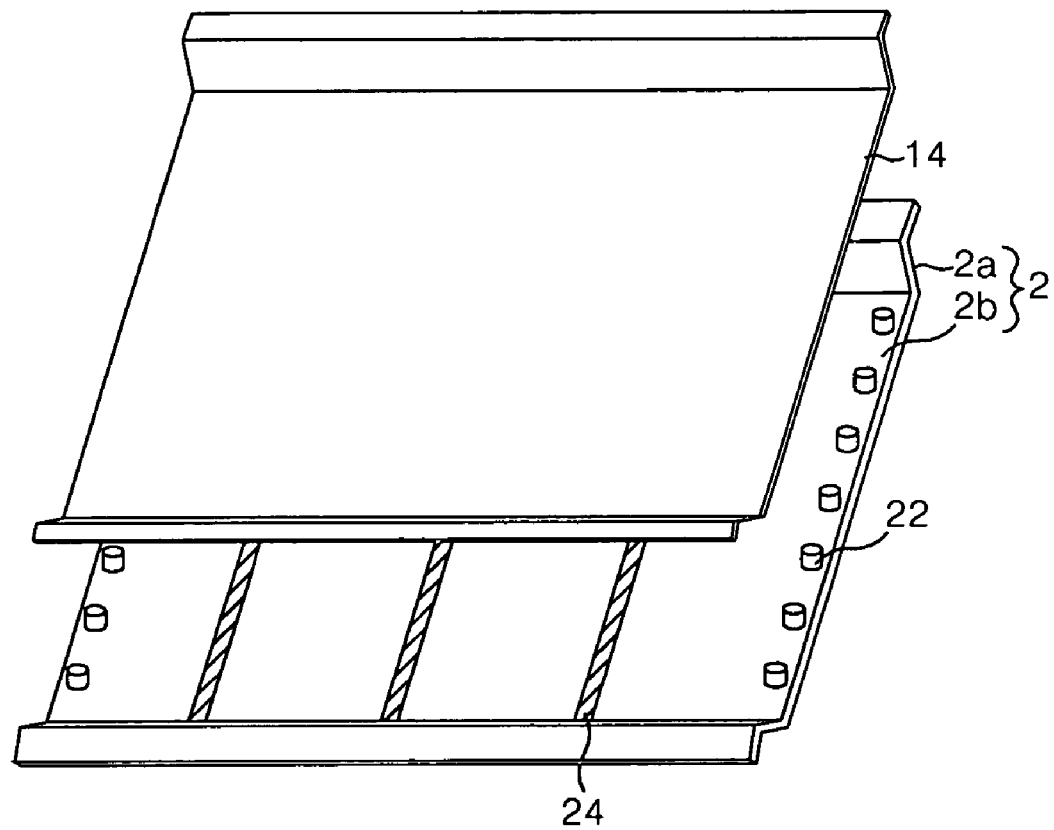
FIGS. 5a to 5e illustrate successive steps of assembling method of a conventional direct-below-type back light unit.
Figure 5B:
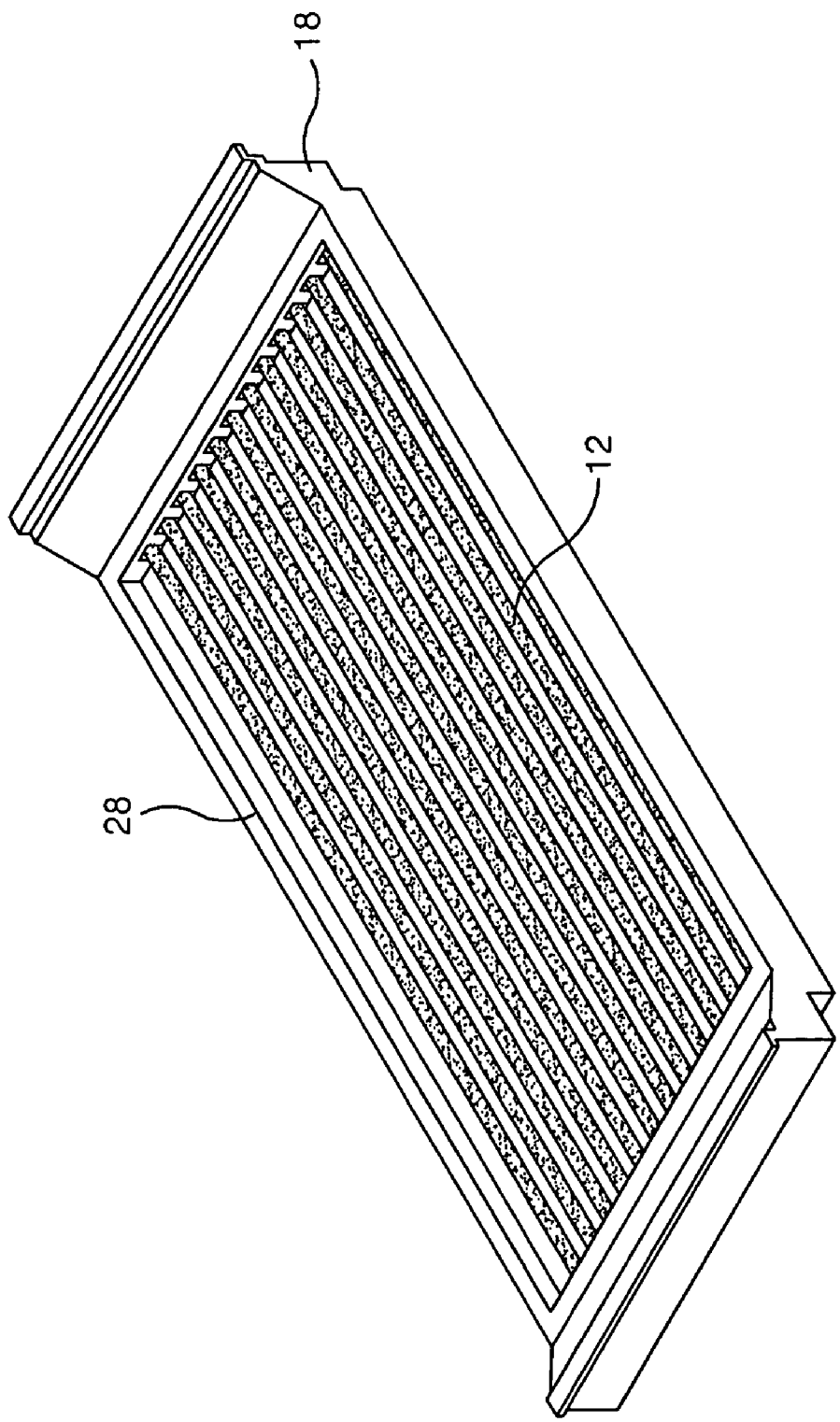
Figure 5C:
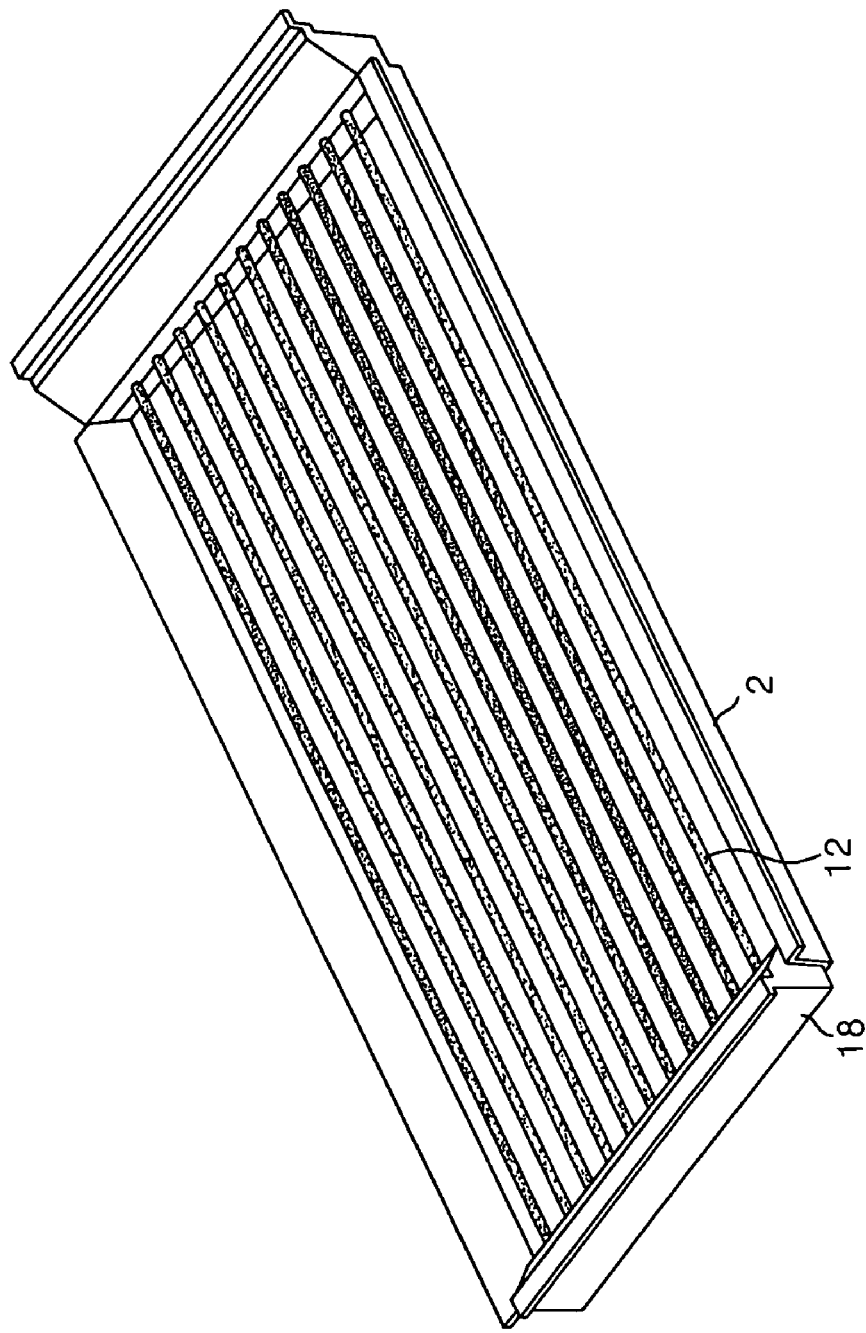
Figure 5D:
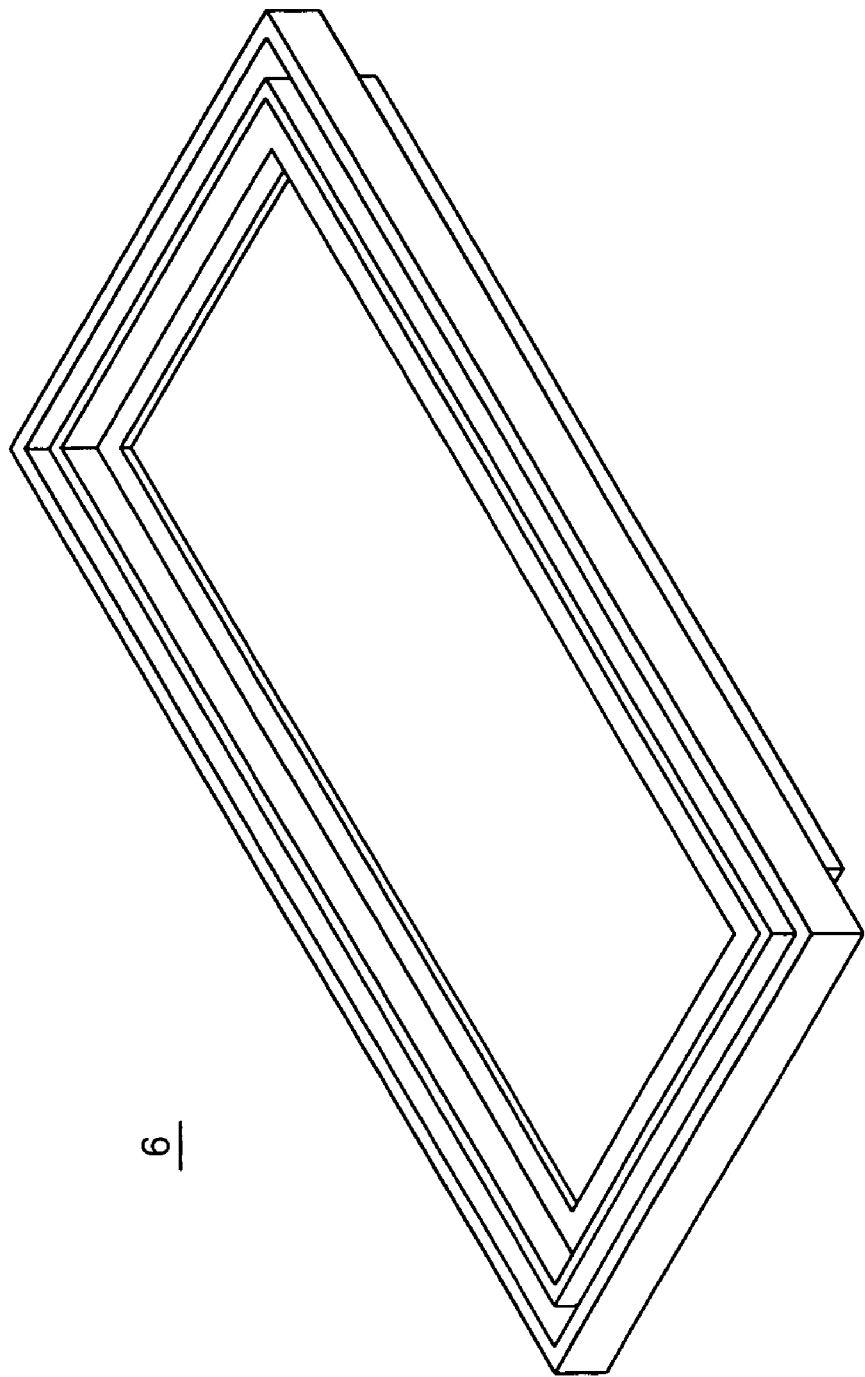
Figure 5E:
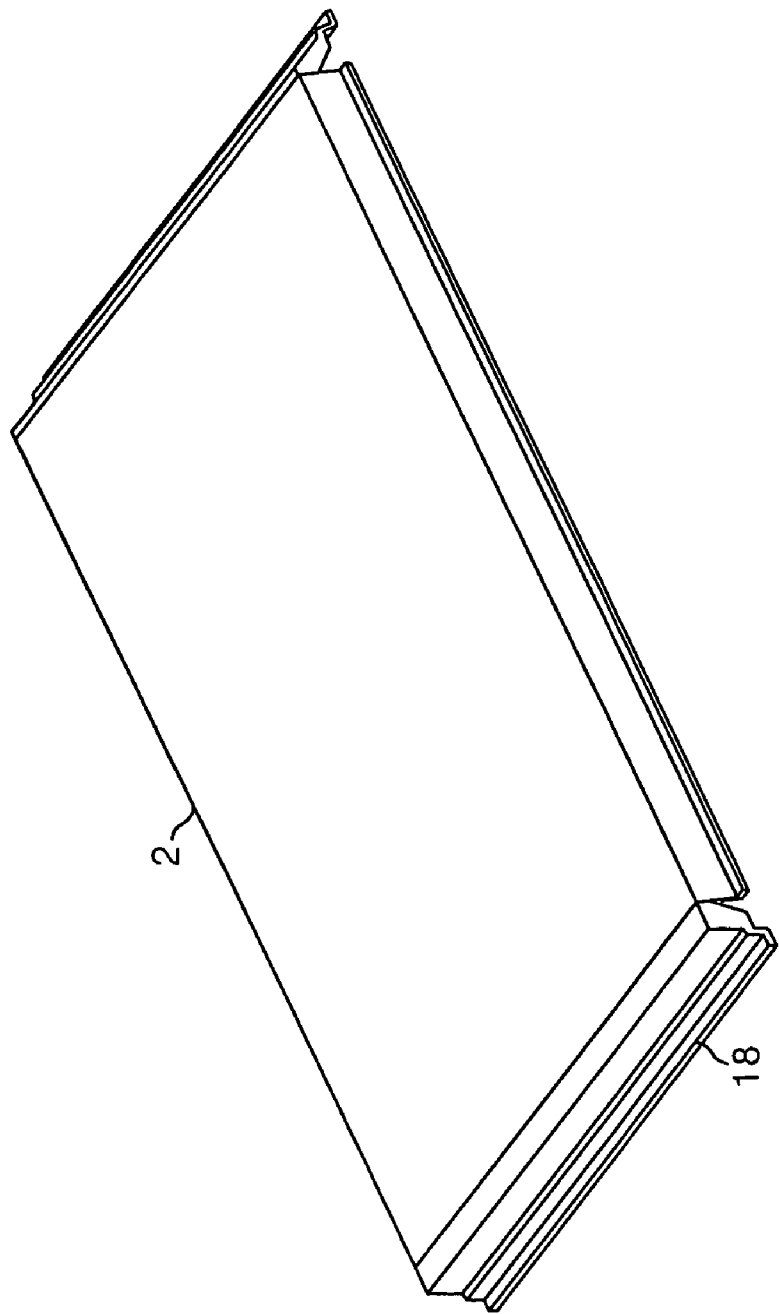
Figure 6:
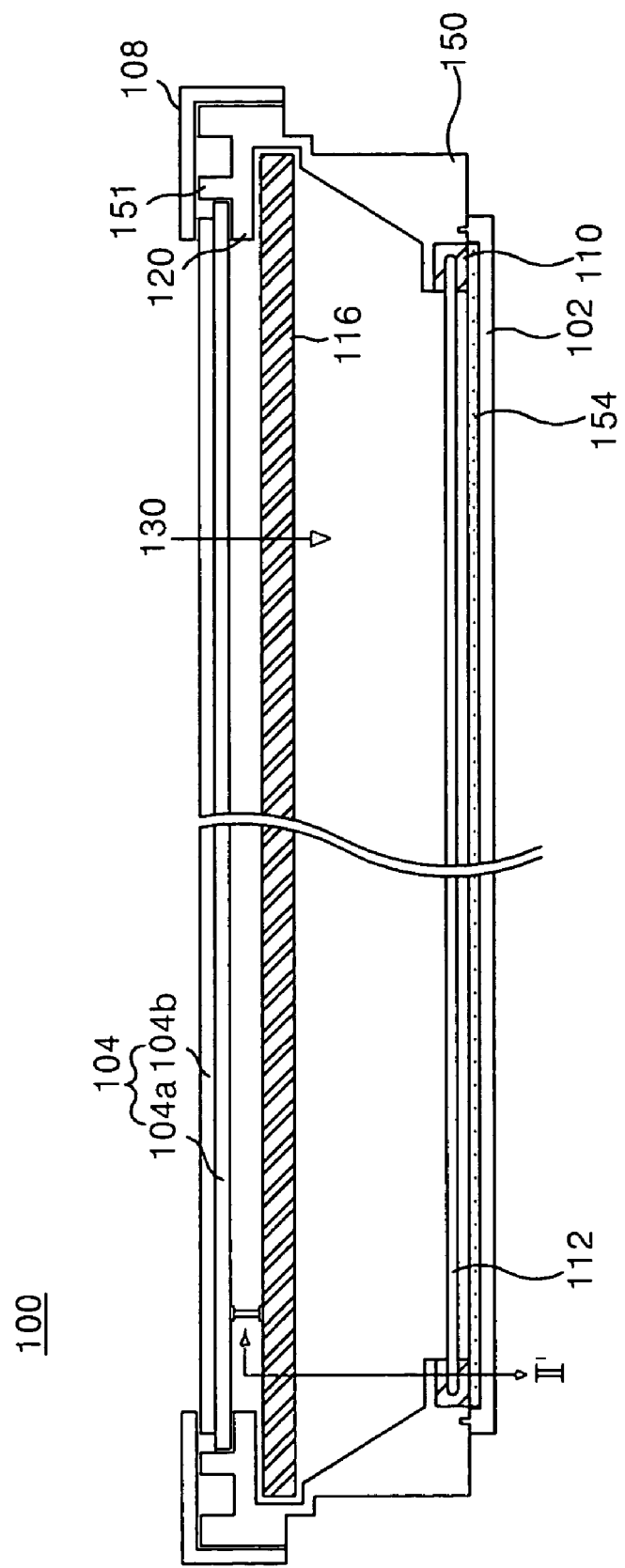
FIG. 6 is a cross-sectional view illustrating a liquid crystal display module according to an embodiment of the present invention.

FIG. 6 is a cross-sectional view illustrating a liquid crystal display module according to the present invention. As shown in FIG. 6, the liquid crystal panel module 100 includes a direct-below-type back light unit 130, a liquid crystal panel 104 stacked on the direct-below-type back light unit 130. A main support 150 for supporting the liquid crystal panel 104 is installed between the liquid crystal panel 104 and the direct-below-type back light unit 130. In addition, the main support 150 reflects the lights reaching the sides of the direct-below-type back light unit 130 to the liquid crystal panel 104.

A top case 108 encloses the edges of the liquid crystal panel 104. The top case 108 has a plane face and a side face bent vertically which are fabricated in a square band shape. The top case 108 is formed to enclose the edges of the liquid crystal panel 104 and the main support 150.

The liquid crystal panel 104 includes a thin film transistor array substrate 104a, a color filter array substrate 104b with liquid crystal (not shown) injected between the thin film transistor array substrate 104a and the color filter array substrate 104b. Red (R), green (G), and blue (B) colored filters and a black matrix are located on the color filter array substrate 104b. Liquid crystal cells are arranged in an active matrix on the thin film transistor array substrate 104a. Each of cells respectively has a thin film transistor for switching video signal to the cell. Video signals applied to the cells change the index of refraction in the liquid crystal cells to thereby display pictures corresponding to the video signals. A tape carrier package (not shown) having a driver integrated circuit mounted thereon is installed on the thin film transistor array substrate 104a of the liquid crystal panel 104, wherein the driver integrated circuit is used to supply driving signals to the thin film transistors.

Figure 7:
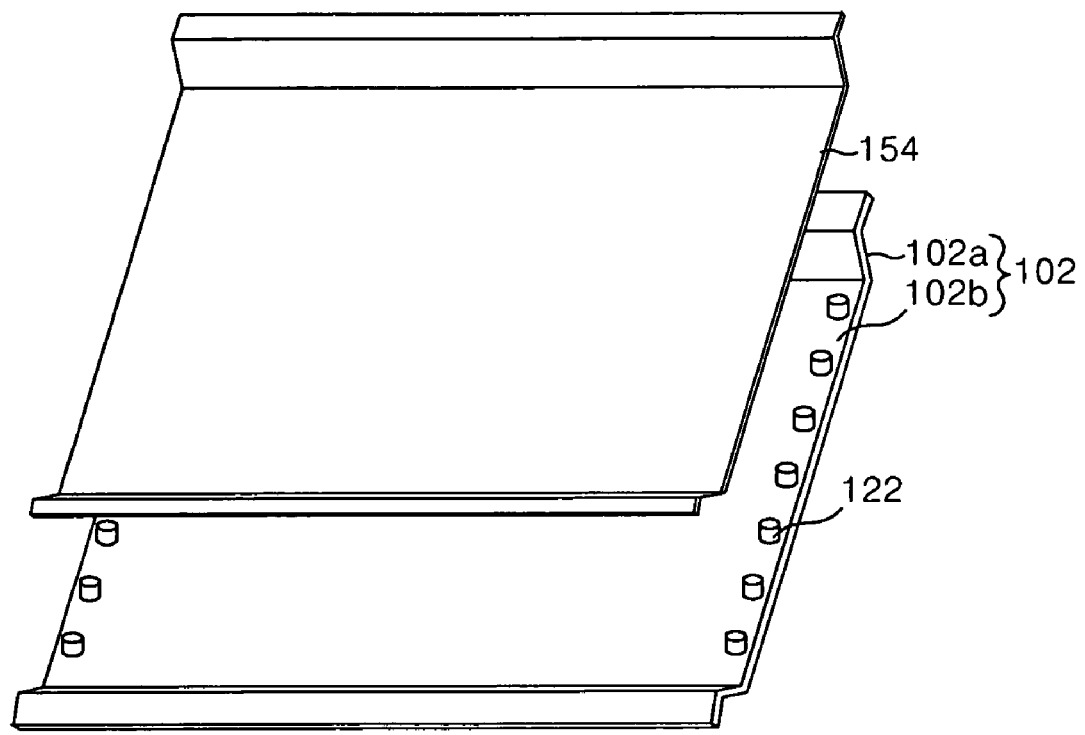
FIG. 7 is a perspective view of a portion of the direct-below-type back light unit shown in FIG. 6.
Figure 8:
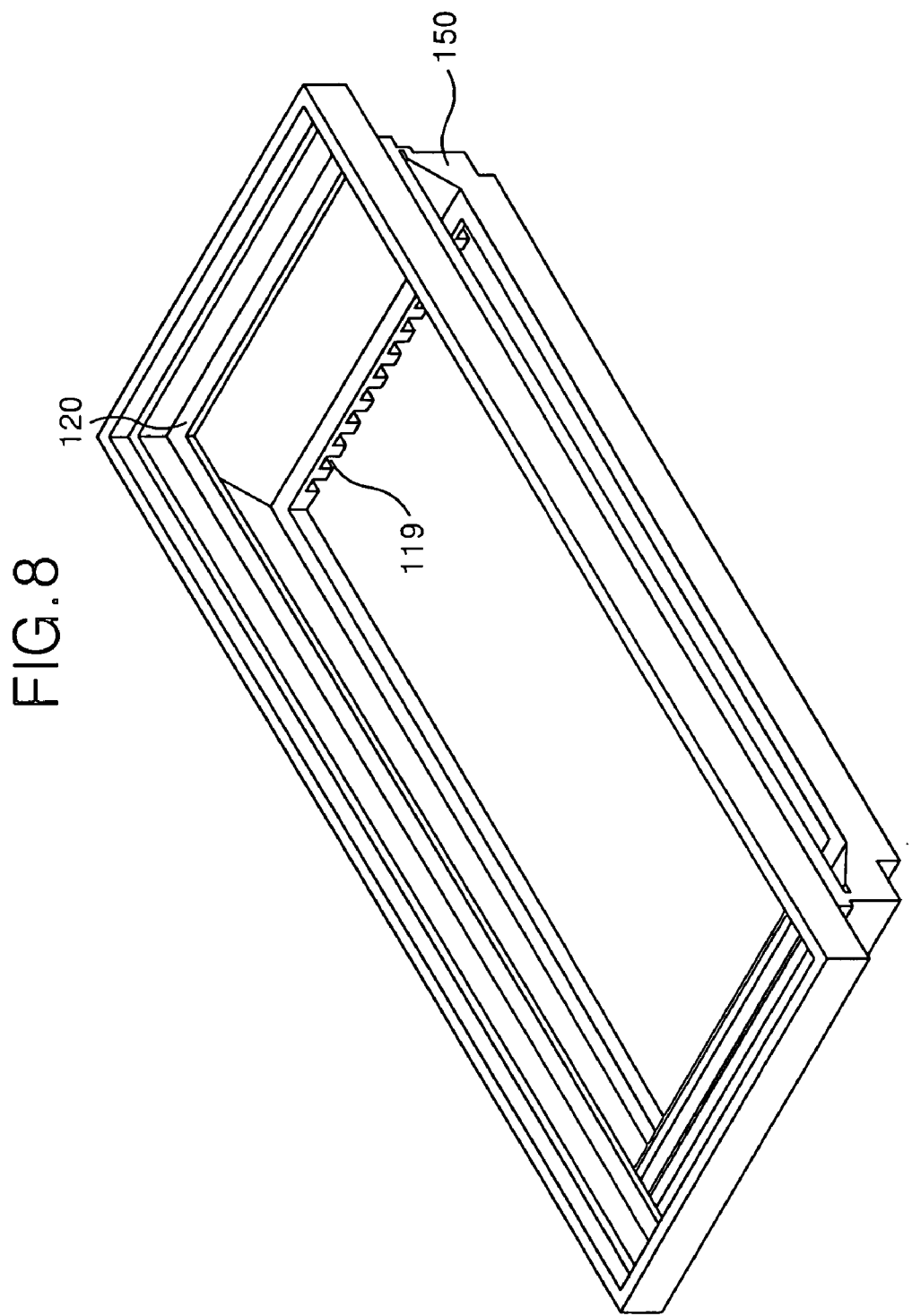
FIG. 8 is a perspective view illustrating the main support of FIG. 6.
Figure 9:
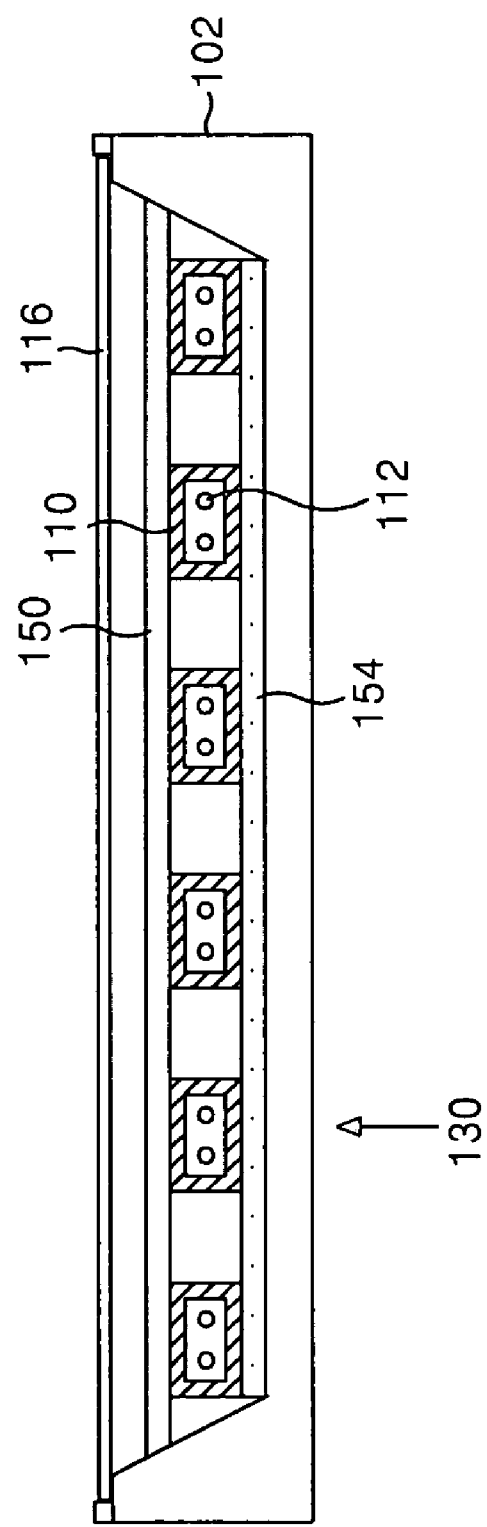
FIG. 9 is a cross-sectional view illustrating the direct-below-type back light unit shown in FIG. 6 along the line II-II'.

FIG. 7 is a perspective view of a portion of the direct-below-type back light unit shown in FIG. 6. FIG. 8 is a perspective view illustrating the main support of FIG. 6. FIG. 9 is a cross-sectional view illustrating the direct-below-type back light unit shown in FIG. 6 along the line II-II'. Referring to FIGS. 6 to 9, the direct-below-type back light unit 130 of the liquid crystal display module 100 according to an embodiment of the present invention includes a bottom cover 102, a reflection sheet 154 stacked on the front face of the bottom cover 102. A plurality of lamps 112 are located above the bottom cover 102. A diffusion plate 116 covers the entire bottom cover 102 and the plurality of lamps. Optical sheets (not shown) are stacked on the diffusion plate 116.

The bottom cover 102 has a bottom surface 102b and an inclined surface 102a extending from the bottom surface 102b. The bottom surface 102b together with the inclined surface 102a of the bottom cover 102 form a stepped structure. Projections 122 are formed along a designated interval on both sides of the bottom surface 102b of the bottom cover 102.

The reflection sheet 154 has substantially the same shape as the bottom cover 102, and has a bottom surface overlapped with the bottom surface 102b of the bottom cover 102 and an inclined surface correspondingly bent the same as the inclined surface 102a of the bottom cover 102. The bottom surface and the inclination surface of the reflection sheet 154 are fitted onto the bottom surface 102b and the inclined surface 102a of the bottom cover 102, respectively. The reflection sheet 154 reflects light from the lamps 112 to the liquid crystal panel 104 to thereby improve the efficiency of light incidence on the liquid crystal panel 104.

The main support 150 is a white mold that has openings 119 into which the ends side of the lamps 112 are inserted. The main support 150 also has an extension part 124 that extends from the openings 119. The inside wall of the extension part 124 is formed to be tilted with a designated slope. The extension part 124 is tilted with a designated slope to reflect light from the lamps 112 to the liquid crystal panel 104. That is, the white mold in the extension part 124 reflects light from the direct-below-type back light unit 130 to the liquid crystal panel 104.

On top of the extension part 124, a supporting member 120 on which the liquid crystal panel 104 is installed forms an 'L' shape with an aligning member 151 for aligning the liquid crystal panel 104 on the supporting member 120. The supporting member 120 together with aligning member 151 form an L' shape that supports and aligns the liquid crystal panel 104. The supporting member 120 of the main support 150 is configured as a lip for supporting the liquid crystal panel 104 above the lamps 112. The support member 120, aligning member 151 and extension part 124 of the main support 150 are portions of the white mold. The mold can be either a resin or a painted material, such as a steel.

The rear face of the main support 150 is attached to the bottom cover 102 having a reflection sheet 154 stacked thereon. This main support 150 is attached to the bottom cover 102 using screws (not shown). The main support is a white mold that integrates openings 119 for a plurality of lamps, the extension part 124, the supporting member 120, and the aligning member 151 into a single piece.

Each of the lamps 112 comprises a glass tube filled with inert gases that has a cathode and an anode respectively installed at the opposite ends of the glass tube. Phosphorus is on the inside wall of the glass tube. The plurality of lamps 112 are grouped into collections with size n (where n is a positive integer) and a collection of the lamps are inserted into a lamp holder 110.

The diffusion plate 116 enables the light radiated from the lamps 112 to go toward the liquid crystal panel 104 with wide range of incident angles and spreads the light out. The diffusion plate 116 includes a transparent resin film. Both surfaces of the resin film are coated with light-diffusion materials. This diffusion plate 116 is installed in the main support 150 under the supporting member 120 within a groove in the extension part 124.

The light radiated from the diffusion plate 116 is diffused light. The efficiency of light through the liquid crystal display 104 is higher when the incident light is perpendicular to the liquid crystal panel 104. For this reason, many optical sheets (not shown) are placed on the diffusion plate 116. The optical sheets (not shown) make the light from the diffusion plate 116 become perpendicular the liquid crystal panel 104, and hence improve the brightness of the liquid crystal display module 100 and hence reduce power consumption. Thus, the light from the diffusion plate 116 reaches the liquid crystal panel 104 via a plurality of optical sheets, which are on the diffusion plate 116 under the supporting member 120.

Figure 10A:
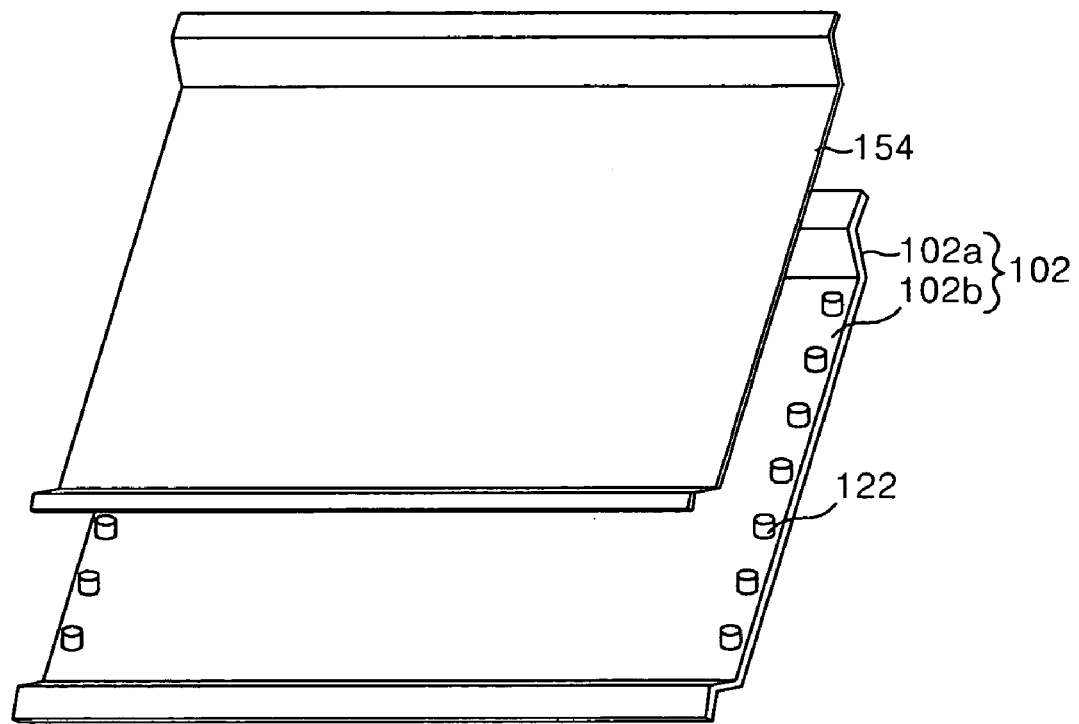
Figure 10C:
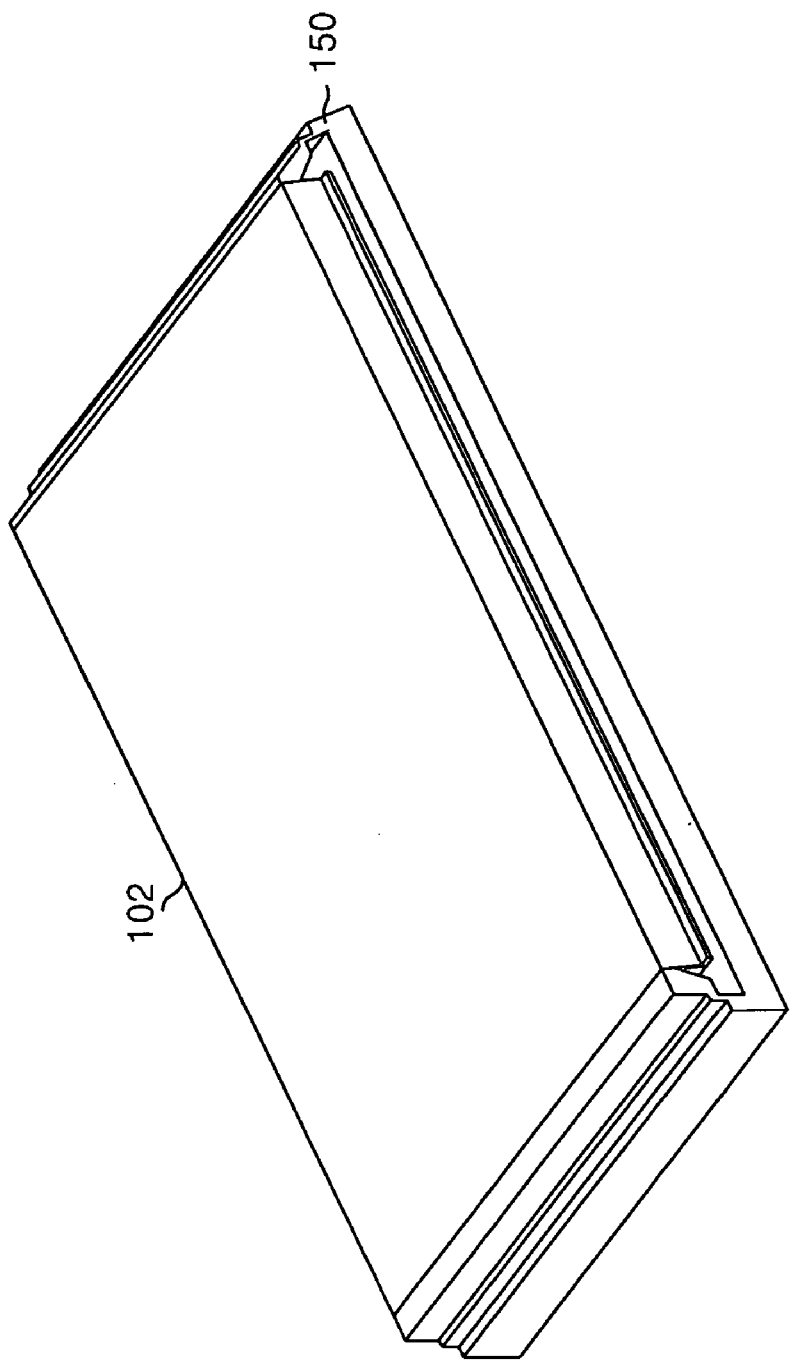

FIGS. 10A to 10C illustrate successive steps of an assembling method for the direct-below-type back light unit of the liquid crystal display module according to an embodiment of the present invention. First, the reflection sheet 154 for reflecting light is stacked on the bottom cover 102, as shown in FIG. 10A. Then, the lamps 112 are inserted into the openings of the main support 150, as shown in FIG. 10b. Thereafter, as shown in FIG. 10c, the main support 150 having the lamps 112 therein is coupled with the bottom cover 102 having the reflection sheet 154 using screws. Further, the diffusion plate 116 having a plurality of optical sheets stacked therein is inserted into the main support 150.

As described above, the liquid crystal display module according to the present invention enables the back light unit to be assembled without a jig and enhances productivity. Further, the liquid crystal display module according to the present invention enables inexpensive reflective surfaces to be used instead of expensive aluminum (Al) so that production costs are reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display module, comprising:
   a liquid crystal panel;
   a bottom cover having a plurality of lamps installed thereabove;
   a reflection sheet for reflecting the light generated from the lamps; and
   a main support having an extension part and a supporting member as an integral frame surrounding the lamps, the main support defining a plurality of openings in which respective ends of the lamps are inserted such that each opening receives one lamp end on a one-to-one basis, the extension part extending from the openings, and the supporting member for supporting the liquid crystal panel.

2. The liquid crystal display module according to claim 1, wherein the inside wall of the extension part is inclined at a designated slope.

3. The liquid crystal display module according to claim 2, wherein the extension part reflects light from the lamps to the liquid crystal panel.

4. The liquid crystal display module according to claim 1, further comprising an aligning member formed on the supporting member to align the liquid crystal panel with the main support member.

5. The liquid crystal display module according to claim 4, wherein the supporting member together with the aligning member form an 'L' shape that supports and aligns the liquid crystal panel.

6. The liquid crystal display module according to claim 1, wherein the main support is a white mold.

7. The liquid crystal display module according to claim 6, wherein the white mold is comprised of a resin.

8. The liquid crystal display module according to claim 1, further comprising a diffusion plate for diffusing the lights generated from the lamps.

9. The liquid crystal display module according to claim 8, wherein the diffusion plate is within a groove of the extension part.

10. The liquid crystal display module according to claim 1, wherein the bottom cover includes a plurality of projections.

11. The liquid crystal display module according to claim 8, further comprising a plurality of optical sheets on the diffusion plate for guiding light toward the liquid crystal panel.

12. The liquid crystal display module according to claim 1, further comprising a top cover for enclosing the main support and the liquid crystal panel.

13. A method for assembling a liquid crystal display module comprising the steps of:
    stacking a reflection sheet on a bottom surface of a bottom cover;
    inserting a plurality of lamps into a plurality of openings of a main support such that each end of each respective lamp is disposed in a corresponding one of the openings on a one-to-one basis with each end being housed in the main support, wherein the main support includes an extension part extending from the opening and a supporting member for supporting a liquid crystal panel to define an integral frame surrounding the lamps; and
    coupling the main support having the lamp installed therein with the bottom cover having the reflection sheet stacked thereon.

14. The assembling method for a liquid crystal display module according to claim 13, further comprising the step of inserting a diffusion plate into the main support.

15. The assembling method for a liquid crystal display module according to claim 14, further comprising the step of stacking a plurality of optical sheets on the diffusion plate.

16. The assembling method for a liquid crystal display module according to claim 15, further comprising the step of placing a liquid crystal panel on the main support having the plurality of the optical sheets inserted therein.

17. The assembling method for a liquid crystal display module according to claim 16, further comprising the step of enclosing the main support and the liquid crystal panel with a top cover.

18. The liquid crystal display module according to claim 1, wherein the main support includes a first end portion, a second end portion, a first side portion, and a second side portion that surround the lamps, such that the first and second end portions has the openings and such that first and second side portions are substantially parallel to the lamps.

19. The assembling method for a liquid crystal display module according to claim 13, wherein the main support includes a first end portion, a second end portion, a first side portion, and a second side portion that surround the lamps, such that the first and second end portions has the openings and such that first and second side portions are substantially parallel to the lamps.

* * * * *